United States Patent
Arora

(10) Patent No.: US 9,942,114 B1
(45) Date of Patent: Apr. 10, 2018

(54) AUTOMATIC TAG-BASED ARCHITECTURE DIAGRAMS

(71) Applicant: Amazon Technologies, Inc., Reno, NV (US)

(72) Inventor: Kamal Arora, New Delhi (IN)

(73) Assignee: Amazon Technologies, Inc., Seattle, WA (US)

( * ) Notice: Subject to any disclaimer, the term of this patent is extended or adjusted under 35 U.S.C. 154(b) by 523 days.

(21) Appl. No.: 14/276,796

(22) Filed: May 13, 2014

(51) Int. Cl.
*G06F 15/16* (2006.01)
*H04L 12/26* (2006.01)

(52) U.S. Cl.
CPC ............................... *H04L 43/045* (2013.01)

(58) Field of Classification Search
CPC . H04L 12/46; H04L 47/2425; H04L 41/5096; H04L 41/0893; H04L 45/02; G06F 21/36
See application file for complete search history.

(56) References Cited

U.S. PATENT DOCUMENTS

| 2006/0106585 | A1* | 5/2006 | Brown | G06F 8/20 |
| | | | | 703/1 |
| 2010/0309206 | A1* | 12/2010 | Xie | G06T 11/206 |
| | | | | 345/440 |
| 2015/0149611 | A1* | 5/2015 | Lissack | H04L 43/0817 |
| | | | | 709/224 |

* cited by examiner

*Primary Examiner* — Tauqir Hussain
*Assistant Examiner* — Kamran Mohammadi
(74) *Attorney, Agent, or Firm* — Davis Wright Tremaine LLP

(57) ABSTRACT

Techniques for automatically generating a graphical representation of the architecture of a computer system are described herein. After receiving a system specification indicating a set of computer system resources, a set of dependencies between pairs of those resources and a set of metadata associated with the resources, the set of resources can be filtered using one or more filtering processes, the filtering processes based at least in part on the metadata. For example, a filtering process may specify including only those resources that have metadata indicating their membership in a certain environment. A graphical representation of the filtered set of resources and the dependencies between pairs of those resources is created, indicating the architecture of the computer system.

20 Claims, 11 Drawing Sheets

Structured Description

Front-End Service
    Load Balancer                          ID: 0001, ENV: PROD, ENV: DEV
        Uses: Scaling Group 0008       ID: 0002, ENV: PROD, ENV: DEV
        Uses: Scaling Group 0012       ENV: PROD, ENV: DEV
Virtual Private Network                 ENV: PROD
    Virtual Private Sub-Network        ID: 0003, ENV: PROD, ENV: DEV
        Scaling Group                    ID: 0004, ENV: PROD, ENV: DEV
            Firewall                         ID: 0008, ENV: PROD, ENV: DEV
            Computer Instance       ID: 0009, ENV: PROD, ENV: DEV
            Computer Instance       ID: 0010, ENV: PROD, ENV: DEV
            Uses: Data Store 0016      ID: 0011, ENV: PROD, ENV: DEV
    Virtual Private Sub-Network        ENV: PROD, ENV: DEV
        Scaling Group                    ID: 0005, ENV: PROD
            Firewall                         ID: 0012, ENV: PROD
            Computer Instance       ID: 0013, ENV: PROD
            Computer Instance       ID: 0014, ENV: PROD
            Uses: Data Store 0016      ID: 0015, ENV: PROD
    Virtual Private Sub-Network        ENV: PROD
        Master Data Store               ID: 0006, ENV: PROD, ENV: DEV
        Uses: Standby 0017             ID: 0016, ENV: PROD, ENV: DEV
    Virtual Private Sub-Network        ENV: PROD
        Standby Data Store              ID: 0007, ENV: PROD
                                                ID: 0017, ENV: PROD

FIG. 5

AUTOMATIC TAG-BASED ARCHITECTURE DIAGRAMS

BACKGROUND

Modern computer systems are frequently implemented as a distributed collection of computer system resources operating cooperatively on a plurality of host systems. Such modern computer systems may be implemented as combinations of virtual and/or physical computer system resources and may adapt those resources as computer system needs change. For example, new computer system resource instances may be created and/or acquired as more clients interact with the computer system and those same resource instances may be destroyed and/or released when client demand decreases. An architecture diagram, which may be based on a structured description of a computer system, shows the system design, the system deployment and/or the system topology, may be useful for understanding a complex computer system but such architecture diagrams may be difficult to maintain on such volatile computer systems. A deployed computer system based on a proposed architecture diagram may be altered as early as the deployment phase, and may be frequently altered during execution either according to changing resource needs, changing business goals and/or changing technology. These changes may lead to a rapid divergence between the original architecture diagram and the deployed computer system. Without an accurate representation of a system, it may be difficult for system designers and/or analysts to locate potential system flaws and to anticipate system failures, leading to reduced system performance, increased system outages and a correspondingly degraded computer system user experience.

BRIEF DESCRIPTION OF THE DRAWINGS

Various embodiments in accordance with the present disclosure will be described with reference to the drawings, in which:

FIG. 5 illustrates an example environment illustrating an example structured description in accordance with at least one embodiment;

DETAILED DESCRIPTION

Figure 1:
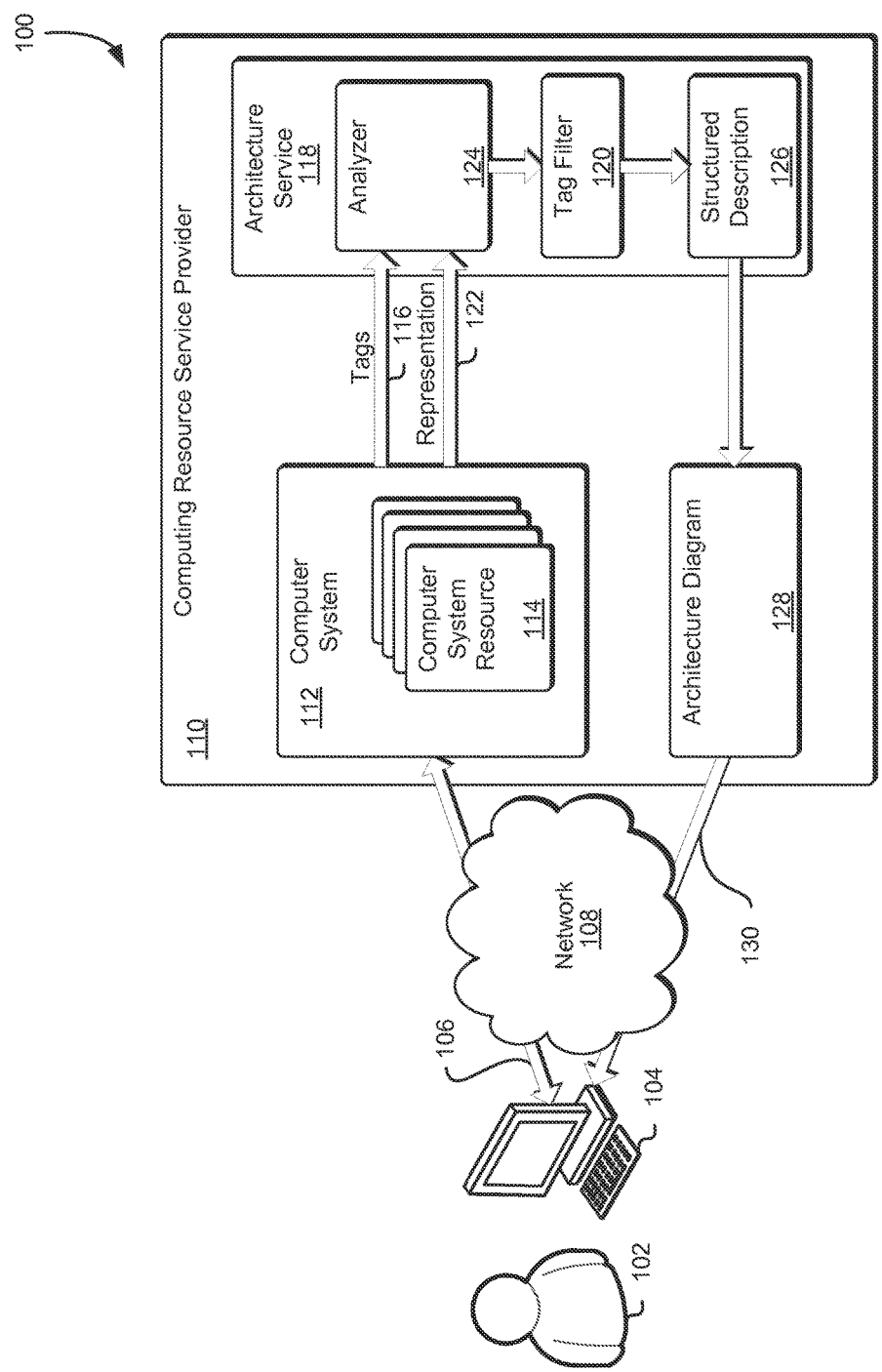
FIG. 1 illustrates an example environment where an architecture diagram of a computer system may be automatically generated in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for automatically creating and updating architecture diagrams representing a computer system comprised of a plurality of computer system resources in a distributed and/or virtualized computer system environment as well as the executable code operating thereon. In particular, techniques are disclosed for utilizing computer system capabilities to enable using computer system tagging to organize computer systems into sortable resources and to use those same tags in combination with known computer system relationships to automatically generate accurate and current architecture diagrams for deployed computer systems. As used herein, the term "architecture diagram" refers to a graphical representation of the structure of a computer system which illustrates resources in the computer system and relationships between those resources. A graphical representation may be a set of image data (e.g., a bitmap file, joint photographic experts group (JPEG) file or the like) that can be used to generate a displayable image on the computer system and/or on some other computer system (such as, for example, a client computer system). An architecture diagram may also include other data and/or metadata associated with the resources in the computer system. The computer systems illustrated by an architecture diagram may include, but may not be limited to, computer systems comprising distributed sets of a plurality of components, subsystems and resources and may further include, but may not be limited to, virtualized and/or non-virtualized components, subsystems and resources.

In such distributed and/or virtualized systems, the plurality of components, subsystems and/or computer resources (referred to herein simply as "resources" or "resource instances") may include a collection of one or more instances of a number of different types and configurations of resources. Such resources may include, but not be limited to, load balancers, scaling groups, host computer systems, database systems, database storage, block storage systems, block storage, data domains and/or other such computer system resources. In some embodiments, the resource elements associated with the computer system may be provided by a representation of the set of resources and/or resource instances. This representation may include a list of information such as the type, number, configuration, metadata and/or other such information describing the associated resource instances.

The resource and/or resource instance metadata may include one or more tags managed by a tagging service or system. A tag may include a key and a value, or a name and a value, or an identifier, or a pair of identifiers, or a list of keys and values, or a list of names and values, or a list of identifiers, or a combination of these and/or other such tag types. For example, a tag identifying the deployment environment for a particular resource may have a key of "Environment" and may have possible values of "Development," "Production," "Testing," "Compliance" and "Other." A resource may have a tag of "Environment: Development" indicating that the resource is used during the development of the computer system. Alternately, a resource may have a tag of "Environment: Production" indicating that the resource is used during the production (or day-to-day operation) of the computer system. A resource that is used for both development and production may have both tags (for example, "Environment: Development" and "Environment: Production"), or may have a compound tag (for example, "Environment: Development: Production"), or may have a new tag (for example, "Environment: DevelopmentAndProduction") or may have some other such tag indicating the multiple environments of the resource. As may be contemplated, the types of tag representation and the tags described herein are merely illustrative examples and other such types of tag representations and tags may be considered as within the scope of the present disclosure.

The architecture diagram of a system may be a graphical representation of a designed and/or running computer system specifying a plurality of computer system resources. The architecture diagram may specify resource groups such as firewalls, scaling groups and/or other such groups. One or more resources may be associated with and/or placed in resource groups indicating one or more resource groupings and/or one or more resource dependencies. Resource groups may be nested so that, for example, a scaling group may include one or more firewalls which may include one or more resources and/or may include one or more other resource groups. As used herein, the term "firewall" may refer to a secure network region which may be configured to ensure that only authorized connections may be made to resources within that secure network region. A firewall may be configured to ensure this security by, for example, examining network traffic to verify that incoming and/or outgoing network packets conform to one or more security policies. A firewall may be configured to verify credentials of connections to resources, may be configured to validate those credentials using one or more policy services or perform combinations of these and/or other security-related functions. A firewall may be implemented as hardware, software, firmware, a virtual device or as a combination of these and/or other such implementation methods. The architecture diagram may specify one or more network representations indicating one or more networks, sub-networks, private networks, virtual networks or combinations of these and/or other such network designations. One or more resources and/or one or more resource groups may be associated with and/or placed in the network representations indicating one or more network groups and/or one or more network and/or resource dependencies. Network representations may be nested so that, for example, a network representation may include one or more private network representation, which may include one or more private sub-network representations, each of which may include one or more other sub-networks, one or more resource groups and/or one or more resource instances.

An architecture diagram may specify a topological representation of a computer system which may indicate, for example, resource dependencies, resource connections, resource interdependencies, resource group dependencies, connections and/or interdependencies, network and sub-network dependencies, connections and/or interdependencies and/or other such computer system relationships. For example, instances in a scaling group may require access to a data store containing customer data in order to function. In such a computer system, the architecture diagram may indicate this requirement with an arrow from each instance (or from the scaling group) to the data store. A topological representation of a computer system may also indicate resource groupings, network groupings and/or other such groupings as described herein above. In some embodiments, an architecture diagram may be illustrated by a graphical representation of the system architecture, or may be specified by a structured description of the system (using, for example, a system description syntax or language such as JavaScript Object Notation (JSON), Extensible Markup Language (XML), a custom language or other such language) or may be indicated by a combination of these and/or other such representations. As may be contemplated, the types of information embodied in an architecture diagram, the type and scope of the information of the topology representation, the type of specification and/or other such factors relating to architecture diagrams described herein are merely illustrative examples and other such types of information embodied in the architecture diagram, types and scope of the information of the topology representation, types of the specification and/or other such factors related to the architecture diagram may be considered as within the scope of the present disclosure.

In an illustrative example, a computer system may be deployed with a front-end system associated with a firewall within a private network containing two virtual machine (VM) instances running on a host computer system, both of which may be connected to a data store running within the same private network. The initial architecture diagram for such a system may indicate that the front-end system is associated with a firewall within the private network, the firewall may contain the two instances and both instances connected to the data store, also contained within the private network. In some embodiments, one or more ports and/or addresses on one or more of the instances may be used to facilitate associations with the firewall by, for example, setting port security and/or other such port parameters. Similarly, one or more ports and/or addresses on the front-end system may also be used to facilitate associations with the firewall by, for example, setting port security and/or other such port parameters. The various resources, resource groups and/or networks may include metadata specifying one or more tags such as, for example, the type of resource, the environment, the resource identifier (ID) and/or other such metadata tags.

In the illustrative example, the user may later decide that including the data store in the same private network may put the security of the data store at risk and so may decide to create new private sub-networks and to cause the computer system to migrate the data store to a new private sub-network (i.e., by copying, moving, instantiating and deleting and/or other such migration methods). As a result of the migration, one of the private sub-networks may contain the firewall and a different one of the private sub-network may contain the data store. Such a system change may require a topology change in the architecture diagram to reflect the new system structure. Such a system change may also introduce new tags associated with the resources such as, for example, tags indicating the sub-network that the firewall is contained within and/or the sub-network that the data store is contained within. The tags, the instantiated system and/or inferred relationships between networks, sub-networks, resource groups and/or resources may be then used to update the architecture diagram to reflect the new topology. Further changes to the running system, as a result of design changes, scaling of resources based on resource demands, business needs, technology changes and/or other such factors may result in similar updates to the architecture diagram based on tags, the instantiated system and/or inferred relationships between resources.

An automatic tag-based architecture diagram may be created and/or updated for a computer system by first obtaining a representation of the computer system. The representation of the computer system may be based at least in part on one or more detailed system specifications which specify the resources, resource groups, networks, sub-networks and/or other such specifications as well as the relationships and/or dependencies between the specified resources, resource groups, networks, sub-network and/or other such specifications. The representation of the computer system may also be based at least in part on one or more instantiations of the computer system. The instantiation of the computer system may be examined by executing instructions to query resources associated with the computer system using system calls, application programming interface (API) calls and/or other such methods. The representation of the computer system may also be based at least in part on examining data and/or metadata associated with the plurality of resources, resource groups, networks, sub-networks and/or other such computer system resource entities associated with the computer system. The data and/or metadata associated with the plurality of computer system resource entities may also be examined by executing instructions to request data and/or metadata using system calls, API calls and/or other such methods.

As mentioned herein above, the data and/or metadata associated with the plurality of computer system resource entities may include one or more tags such as the tags described herein. The automatic tag-based architecture diagram may be created and/or updated for a computer system by next obtaining the tags from the computer system resource entities. The tags may be obtained from the data and/or metadata or may be obtained in a separate query. Each resource type may have one or more tags associated with the resource type. Each resource instance may have one or more tags associated with that particular resource instance in addition to the tags associated with the resource type. Tags may be associated with a resource automatically such as, for example, from a default set of tags associated with the resource. Tags may also be associated with a resource manually such as, for example, by user assignment. A particular resource may have a limited number of tags or may have an arbitrary number of tags associated with that resource. Resource groups, networks, sub-networks and/or other such resource entities may also have tags. For example, a private sub-network may include a tag indicating the sub-network ID, a tag indicating a transfer protocol, a tag indicating the parent network or other such tags.

An automatic tag-based architecture diagram may be created and/or updated for a computer system by next deriving or inferring relationships between resources associated with the computer system as mentioned herein above. The derived or inferred relationships may be determined by executing one or more instructions to examine and/or process the system representation, by executing one or more instructions to examine the running system, by executing one or more instructions to examine and/or process the data and/or metadata associated with computer system resources, by executing one or more instructions to examine and/or process the tags associated with the computer system resources or by executing a combination of these and/or other such instructions. The derived or inferred relationships may also be determined from known system architecture practices. For example, in a certain system, every data store may also have database functionality that provides access to the data store. In such an example system, the relationship between a data store and a database may be inferred based on the known system architecture practice in this system. In another example, a firewall may have access to one or more ports and/or addresses configured to accept connections from one or more instances and/or services. In such an example system, the relationship may be inferred based at least in part on the ports and/or addresses. The derived or inferred relationships may be recorded within the computer system by, for example, adding new tags and/or other such metadata to the metadata associated with the resources and/or resource groups. As may be contemplated, the types and/or scope of inferred relationships described herein are illustrative examples and other such types and/or scopes of inferred relationships may be considered as within the scope of the present disclosure.

Resources and/or groups of resources may have a plurality of relationships between them and in some embodiments, resources and/or groups of resources may also have no relationships between them. For example, a distributed data store may be made available to any resource by using a uniform resource identifier (URI) for the distributed data store. Such a resource may have no implicit or explicit relationships with any of the other computer system resources if none of the other computer system resources are dependent on that distributed data store. Such a resource may also have implicit or explicit relationships with one or more of the other computer system resources if those other computer system resources have a dependency on functionality provided by the distributed data store. Relationships may be derived or inferred based on other known data, metadata and/or architectural knowledge about computer system resources. For example, a scaling group typically has a plurality of VM instances that it may start and stop as resource demands change. It may be inferred that, in a computer system where there is a scaling group, there will also be a plurality of VM instances. Similarly, a VM instance may, in some embodiments, always have a data storage volume attached to it and, as such, the presence of a VM instance may allow for inferring a data storage volume. Relationships between resources may also be derived or inferred from other system data such as, for example, security data and/or metadata including, but not limited to, shared encryption keys, user roles, user permissions, access permissions and/or other such security data and/or metadata. As may be contemplated, the techniques for deriving or inferring relationships and dependencies between computer system resources described herein are illustrative examples and other such techniques for deriving inferring relationships and dependencies between computer system resources may be considered as within the scope of the present disclosure.

In some embodiments, the computer system resources may be filtered using a filtering process, the filtering process based at least in part on the tags associated with the resources to restrict or reduce the set of resources that may be shown in the architecture diagram. This filtering process may occur one or more times during the process for automatically creating and/or updating the tag-based architecture diagram for the computer system including prior to obtaining the representation (by a pre-process), prior to inferring the relationships or at any time during the further processing of the data and/or metadata to create and/or update the automatic tag-based architecture diagram. The filtering process may occur multiple times based on user input and/or one or more automatic processes running on a computer system. As described herein above, a resource may be tagged with one or more tags. A user may first wish to filter the computer system using a filtering process to only show the production system by using a tag like the "Environment: Production" tag described herein above. After generating an initial architecture diagram (as described herein below) for the production system, the user may later wish to further restrict the architecture diagram by using a filtering process to only show resources contained in one of the private sub-networks in the computer system, using a tag associated with that private sub-network. Filtering processes may be configured to add, remove or otherwise alter a set of resources based at least in part on one or more tags.

A structured description of the computer system may then be created or updated for the filtered resources, based at least in part on the representation, the tags, the derived or inferred relationships, the metadata, one or more filtering processes or combinations of these and/or other such informational elements. The structured description may be created using, for example, a system description syntax or language as described herein above. The structured description may specify the resources, the resource groups, the networks, relationships between resources, resource groups and/or networks, tags and/or other metadata associated with resources, resource groups and/or networks and/or other such computer system elements. In some embodiments, the structured description may include a subset of the computer system elements based on applying one or more filtering processes. In some embodiments, the one or more filtering processes may be specified within the structured description and such specified filtering processes may be applied to the structured description during subsequent processing of the structured description.

An architecture diagram may then be produced from the structured description. Icons representing various resources, resource groups, networks, connections, dependencies and/or other such computer system elements may be placed within the architecture diagrams and arranged according to a topology based at least in part on the structured description. The icons may be selected from a palette of icons created and/or supplied by a computer system process. In some embodiments, the icons may be selectable by the user and may be used to display additional information about the computer system resource such as, for example, data and/or metadata associated with the computer system resource, tags associated with the computer system resource and/or other such information. In some embodiments, the icons may also be selectable by the user and may be used to add additional tags and/or other such metadata to the resource associated with the icon.

The architecture diagram may include one or more groupings of the placed icons which may be determined by information contained in the structured description. The architecture diagram may also include one or more connections and/or dependencies between computer system entities represented by icons which may be drawn as connectors (such as, for example, arrows) between the icons. The architecture diagram may be saved and/or exported as a picture (in one of a plurality of picture formats) for display or presentation to a user. The architecture diagram may be displayed using a service such as an architecture diagram browser which may be configured to produce architecture diagrams using structured descriptions, save architecture diagrams, load architecture diagrams, apply filtering processes to architecture diagrams and/or perform other such processes associated with architecture diagrams. The architecture diagram browser may be configured as a computer service such as a web service, may be configured as a standalone application, may be configured as a mobile device application or may be configured as some other such type of application. As may be contemplated, the method of implementation of the architecture diagram browser described herein is an illustrative example and other such methods of implementation of the architecture diagram browser may be considered as within the scope of the present disclosure.

In some embodiments, the architecture diagram may be periodically updated according to changes in the computer system entities represented by the structured description. For example, if a scaling group adds several VM instances, the architecture diagram may be updated to reflect this addition. In some embodiments, the architecture diagram may be updated to reflect changes in the structured description. In such embodiments, changes in the structured description may occur as a result of periodic polling of the computer system representation, or as a result of applying new filtering processes, or as a result of API calls to computer system resources, or as a result of API calls from computer system resources, or as a result of user actions or as a result of a combination of these and/or other such conditions. In some embodiments, an icon representing a computer system entity such as a computer system resource may be placed within the architecture diagram prior to the determination of all connections or dependencies between the computer system entity and other computer system entities. In such embodiments, updates to the structured description as a result of system conditions such as polling, filtering, user actions and the like may determine further connections between the computer system entity and other computer system entities may add additional connections between icons representing the computer system entity and icons representing one or more of the other computer system entities.

FIG. 1 illustrates an example environment 100 where an architecture diagram representing a computer system within a computer system environment may be automatically generated in accordance with at least one embodiment. A user 102 may connect 106 to a computer system 112 through a computer system client device 104. The computer system 112 may be operating within a computing resource service provider 110. In some embodiments, the computing resource service provider 110 may provide a distributed, virtualized and/or datacenter environment within which one or more applications, processes, services, virtual machines and/or other such computer system entities may be executed. In some embodiments, the user 102 may be a person, or may be a process running on one or more remote computer systems, or may be some other computer system entity, user or process. The command or commands to connect to the computer system instance may originate from an outside computer system and/or server, or may originate from an entity, user or process on a remote network location, or may originate from an entity, user or process within the computing resource service provider, or may originate from a user of the computer system client device 104, or may originate as a result of an automatic process or may originate as a result of a combination of these and/or other such origin entities. In some embodiments, the command or commands to initiate the connection 106 to the computing resource service provider 110 may be sent to the computer system 112, without the intervention of the user 102. The command or commands to initiate the connection 106 to the computer system 112 may originate from the same origin as the command or commands to connect to the computing resource service provider 110 or may originate from another computer system and/or server, or may originate from a different entity, user or process on the same or a different remote network location, or may originate from a different entity, user or process within the computing resource service provider, or may originate from a different user of a computer system client device 104, or may originate as a result of a combination of these and/or other such same and/or different entities.

The user 102 may request connection to the computing resource service provider 110 via one or more connections 106 and, in some embodiments, via one or more networks 108 and/or entities associated therewith, such as servers connected to the network, either directly or indirectly. The computer system client device 104 that may request access to the computer system 112 may include any device that is capable of connecting with a computer system via a network, including at least servers, laptops, mobile devices such as smartphones or tablets, other smart devices such as smart watches, smart televisions, set-top boxes, video game consoles and other such network-enabled smart devices, distributed computer systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computer system with a plurality of network nodes or other such networks. The network may also operate in accordance with various protocols, such as those listed below, Bluetooth, WiFi, cellular network protocols, satellite network protocols and/or others.

The computing resource service provider 110 may provide access to one or more host machines as well as provide access to computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider 110 may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment. In some embodiments, the host machines may be guest virtual machines operating on physical machines located within the computer system environment.

The computer system 112 may include one or more computer system resources 114 such as virtual machine instances, host machines, data stores, databases, distributed data stores, load balancers, scaling groups, front-end services, firewalls, networks, sub-networks, private networks, private sub-networks and/or other such computer system resources. A subset of the computer system resources 114 may cooperatively operate together to provide one or more computer system services for the user 102. In some embodiments, a subset of the computer system resources 114 may be operating in a remote and/or distributed datacenter or may be operating in a customer provided datacenter or may be operating in some other such location. A representation 122 of the computer system 112 and/or of a computer system service provided by a subset of the computer system resources 114 may be provided to an analyzer 124 within an architecture service 118. The representation 122 may include a list of information such as the type, number, configuration, metadata and/or other such information describing the computer system resources 114. The representation 122 may also include data and/or metadata associated with at least a subset of the connections and/or dependencies between the computer system resources 114. For example, the representation 122 may include a list of resources specifying a front-end service, a load balancer, a private network, a firewall, two VM instances and a data store. The representation 122 may also include data and/or metadata indicating how the front-end service connects to the load balancer, that the load balancer manages the firewall, that the firewall is contained within the private network, that the VM instances are contained within the firewall and that the VM instances connect to the data store using a locator such as a URI.

One or more tags 116 associated with the computer system 112 and/or associated with a computer system service provided by a subset of the computer system resources 114 may be provided to the analyzer 124 within the architecture service 118. The one or more tags 116 may be managed by a tagging service or system. As mentioned herein above, a tag may include a key and a value, or a name and a value, or an identifier, or a pair of identifiers, or a list of keys and values, or a list of names and values, or a list of identifiers, or a combination of these and/or other such tag types. The tags may be obtained from data and/or metadata associated with the computer system resources 114. Each different computer system resource type may have one or more tags associated with that resource type so that, for example, every VM instance may have a first set of tags, a private network may have a second set of (possibly partially overlapping) tags and other resources may have other sets of tags. Each resource instance may have one or more tags associated with that particular resource instance in addition to the tags associated with the resource type. As mentioned herein above, tags may be associated with a resource automatically, manually (by, for example, user assignment) or by a combination of automatic and manual assignment. Resources, resource groups, networks, sub-networks and/or other such resource entities may have associated tags.

The analyzer 124 may use the tags 116 and/or may use the representation 122 to produce a structured description 126 of the computer system and/or the computer system service provided by a subset of the computer system resources 114. As described herein above, the structured description 126 may specify the computer system resources 114 as well as any resource groups, networks, sub-networks, relationships between computer system resources 114, tags 116, other data and/or metadata or combinations of these and/or other such computer system elements. In some embodiments, the structured description 126 may be altered by executing one or more filtering processes based at least in part on the tags 116 and performed by a tag filter 120. The tag filter 120 may be a service configured to perform one or more filtering processes. The filtering processes may include processes to restrict the computer system resources contained in the structured description 126 to a subset of the computer system resources 114. In some embodiments, the one or more filtering processes may be specified within the structured description 126 and such specified filtering processes may be applied to the structured description 126 by the tag filter 120 at an automatic, periodic and/or user-specified time.

The architecture service 118 may then use the structured description 126 to produce one or more architecture diagrams 128. The architecture diagram 128 of the computer system 112 and/or of the computer system service provided by a subset of the computer system resources 114 may be a graphical representation of the computer system and/or of the computer system service. The architecture diagram may illustrate the computer system resources 114, the resource groups, the computer system resources 114 within the resource groups, connections, dependencies, networks, sub-networks, private networks, virtual networks and/or other such computer system entities. An architecture diagram 128 may also illustrate the topological structure of the computer system 112 and/or of the computer system service provided by a subset of the computer system resources 114 and may illustrate topological relationships including, but not limited to, resource dependencies, resource connections, resource interdependencies, resource group dependencies, connections and/or interdependencies, network and sub-network dependencies, connections and/or interdependencies and/or other such topological relationships. An architecture diagram 128 may also illustrate resource groupings, network groupings and/or other such groupings within the computer system 112 and/or within the computer system service provided by a subset of the computer system resources 114.

The architecture diagram 128 may be provided 130 to the user 102 via the network 108 and displayed on the computer system client device 104 or to be displayed on some other computer system. The architecture diagram 128 may be provided 130 to the device 104 as a set of image data (e.g., a bitmap file, joint photographic experts group (JPEG) file or the like) that can be used to generate a displayable image on the computer system client device 104. The architecture diagram 128 may be displayed on the computer system client device 104 using an architecture diagram browser as described herein above. In some embodiments, the architecture diagram browser may be configured as a computer service such as a web service which may be provided as a service by the computing resource service provider 110. As described herein above, the architecture diagram 128 may be periodically updated according to changes in the computer system 112 and/or changes in the computer system service provided by a subset of the computer system resources 114. The updated architecture diagram 128 may be provided to the user 102 via the network 108 and displayed on the computer system client device 104.

Figure 2:
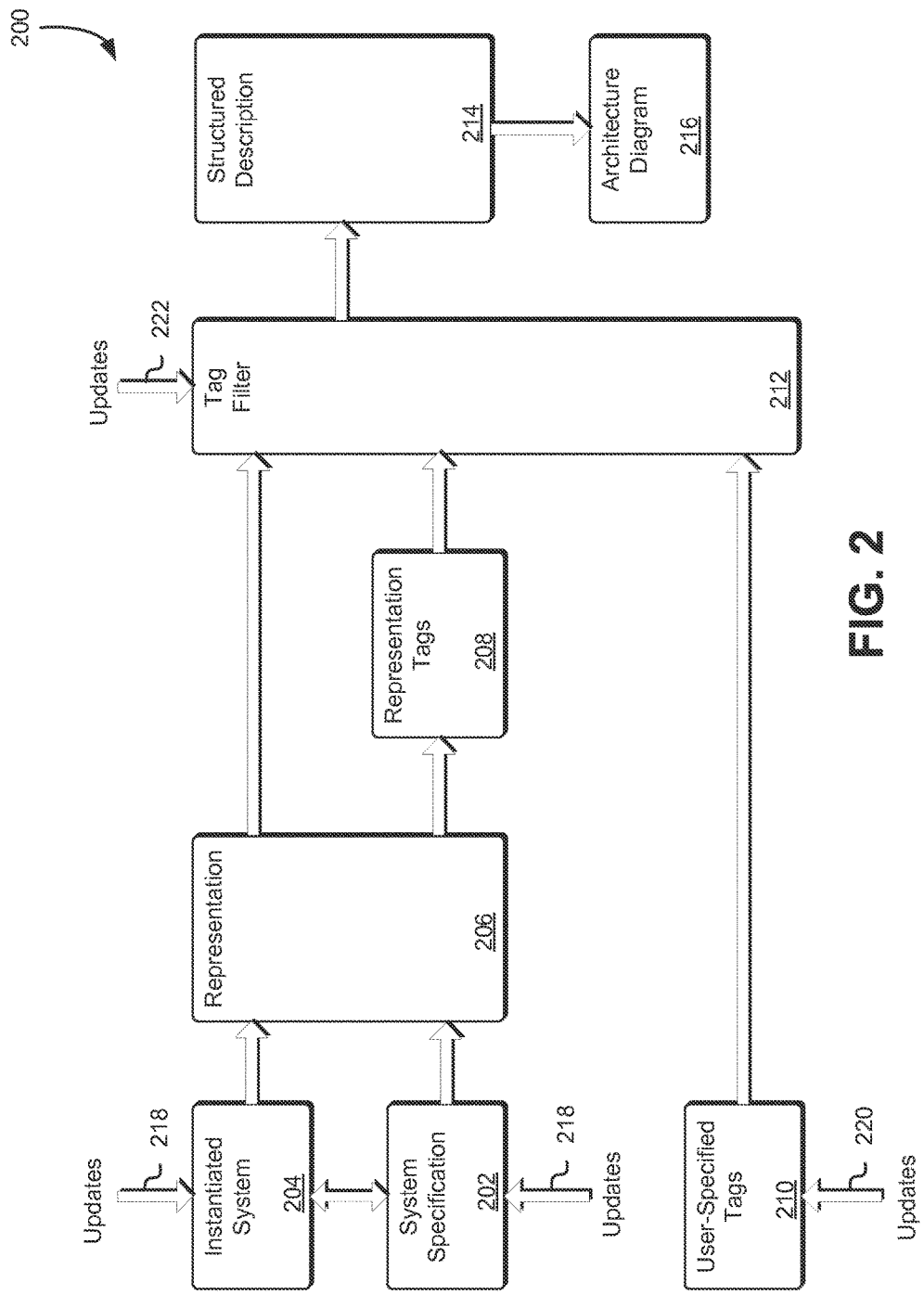
FIG. 2 illustrates an example environment where an architecture diagram may be automatically generated and updated in accordance with at least one embodiment.

FIG. 2 illustrates an example environment 200 where an architecture diagram may be automatically generated and updated as described herein at least in connection with FIG. 1 and in accordance with at least one embodiment. A system specification 202 and/or an instantiated system 204 may be used to produce a representation 206 such as the representation 122 described herein in connection with FIG. 1. The system specification 202 may be based at least in part on the instantiated system 204 or the instantiated system 204 may be instantiated based at least in part on information included in the system specification 202. The representation 206 may contain one or more representation tags 208 which are tags based on, derived from and/or contained in the representation 206. For example, the representation tags 208 may include those tags which are associated with the resource type of the resources which together comprise the instantiated system or may include those tags which are associated with the resource instance as described herein above. The representation tags 208 may also include one or more automatically generated tags, or may include one or more system-specified tags or may contain one or more of the other tag types described herein at least in connection with FIG. 1.

The one or more representation tags may be provided to a tag filter 212 such as the tag filter 120 described herein in connection with FIG. 1. One or more user-specified tags 210 may also be provided to the tag filter 212. The one or more user-specified tags 210 may include tags related to, for example, the environment of a resource, or a logical resource group or some other such user-specified tag. The representation tags 208 and the user-specified tags 210 may be used by the tag filter 212 to optionally perform one or more filtering processes to filter the resources in the representation 206 and to produce a structured description 214 such as the structured description 126 described herein in connection with FIG. 1. The structured description 214 may be used to produce an architecture diagram 216 such as the architecture diagram 128 described herein in connection with FIG. 1. One or more updates 218 to the instantiated system 204 and/or to the system specification 202 may alter the representation 206, which may alter the representation tags 208 and which may result in a new structured description 214 and/or a new architecture diagram 216. Similarly, one or more updates 220 to the user-specified tags 210 and/or one or more updates 220 to settings in the tag filter 222 (such as selecting a different set of tags to filter on) may also result in a new structured description 214 and/or a new architecture diagram 216.

Figure 3:
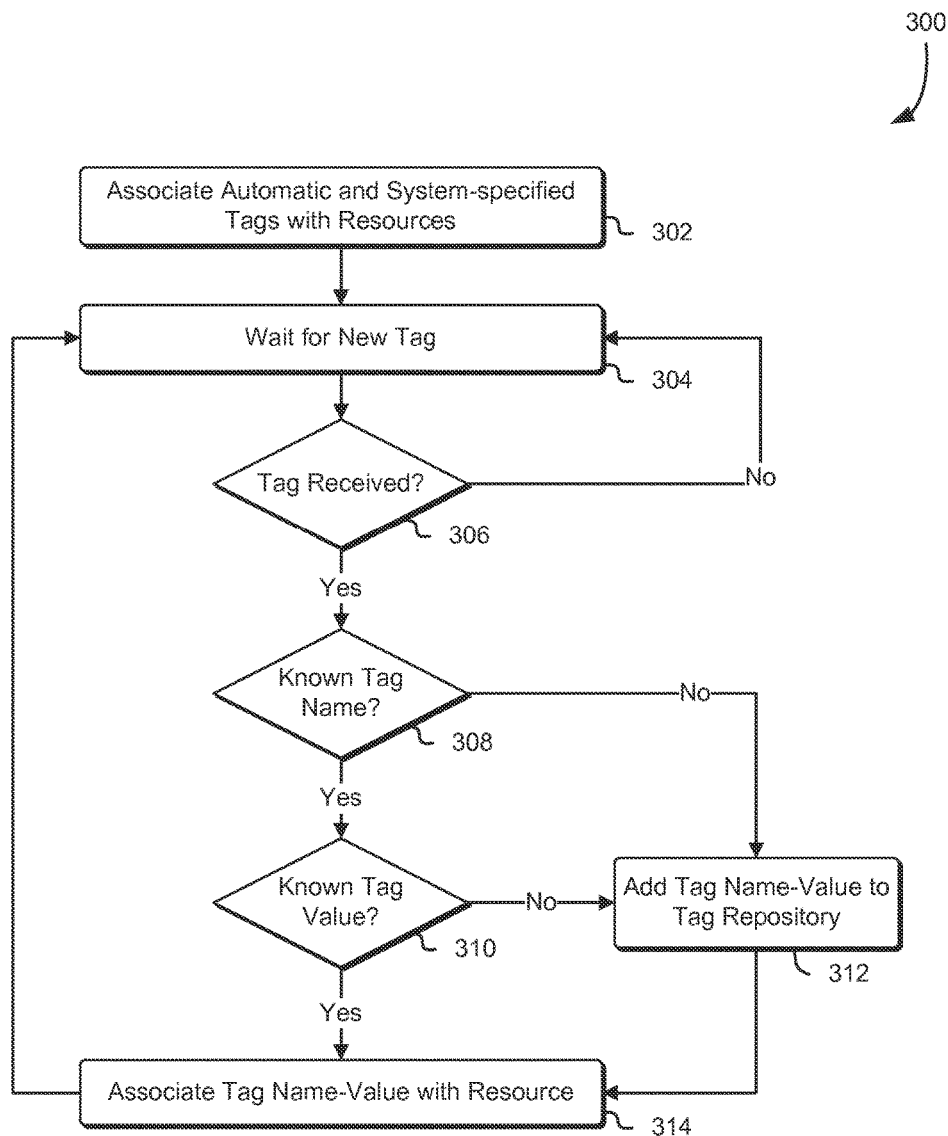
FIG. 3 illustrates an example process for applying tags to resources within a computer system in accordance with at least one embodiment.

FIG. 3 illustrates an example process 300 for applying tags to resources as described herein at least in connection with FIG. 1 and in accordance with at least one embodiment. An architecture service such as the architecture service 118 described herein in connection with FIG. 1 may perform at least a portion of the process illustrated in FIG. 3. Other entities operating with a computer system environment may also perform at least a portion of the process illustrated in FIG. 3 including, but not limited to, services, applications, modules, processes, operating system elements, virtual machine elements, network hardware, controlling domain elements (e.g., a hypervisor) or combinations of these and/or other such entities operating within the computer system environment.

A computer system may have an automatic architecture diagram created and/or updated for that computer system by first applying tags to the resources in the computer system. An architecture service, or a tagging service associated with the architecture service, may first associate any automatic and/or system-specified tags with the resources 302 associated with a computer system. These tags may include tags that are system specified for all resources of a given resource type, may include automatically generated tags (such as, for example, tags based on network properties) and may include other such pre-determinable tags. The architecture and/or tagging service may then wait for new tags 304 associated with the computer system to be received. These new tags may be received as a result of new user-specified tags, new automatic tags, new resources being added to the computer system or for combinations of these and/or other such reasons.

When a new tag is received 306, the architecture and/or tagging service may, in some embodiments, determine whether the tag specifies a known tag name 308 and a known tag value 310. In such embodiments, the architecture and/or tagging service may impose an organization on the received tags such as, for example, by recording received tags in a tag repository 312. In some embodiments, the architecture and/or tagging service may then associate the new tag with the associated resource 314 such as, for example, by recording the tag in data and/or metadata associated with the computer system resource as described herein above. The architecture and/or tagging service may then continue waiting for new tags and/or may also begin the process for a different computer system.

Figure 4:
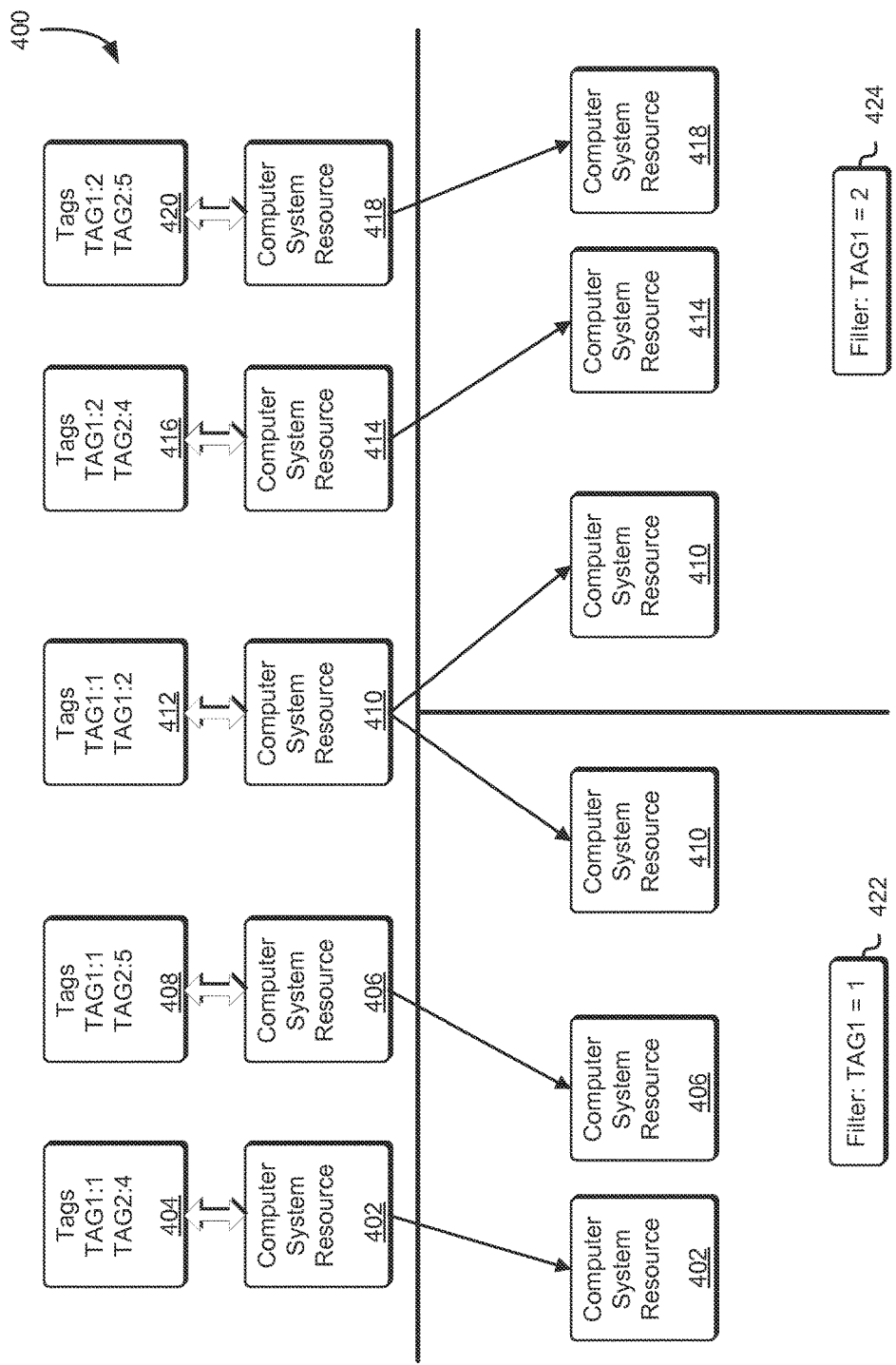
FIG. 4 illustrates an example environment where resources may be filtered based on tags associated with those resources in accordance with at least one embodiment.

FIG. 4 illustrates an example environment 400 where resources are filtered based on tags associated with those resources as described herein at least in connection with FIG. 1 and in accordance with at least one embodiment. In the example illustrated in FIG. 4, a computer system resource 402 may have tags 404 with a value for a tag "TAG1" set to "1" and a value for a tag "TAG2" set to "4" and a computer system resource 406 may have tags 408 with a value for a tag "TAG1" set to "1" and a value for a tag "TAG2" set to "5." Applying a filtering process selecting resources where "TAG1=1" may select computer system resource 402 and computer system resource 406. Applying a filtering process selecting resources where "TAG2=4" may select computer system resource 402. Applying a filtering process selecting resources where "TAG2=5" may select computer system resource 406. Applying a filtering process selecting resources where "TAG2=6" may select neither computer system resource 402 nor computer system resource 406.

Additional computer system resources may have similar tag values. FIG. 4 further illustrates a computer system resource 414 which may have tags 416 with a value for a tag "TAG1" set to "2" and a value for a tag "TAG2" set to "4" and a computer system resource 418 which may have tags 420 with a value for a tag "TAG1" set to "2" and a value for a tag "TAG2" set to "5." A computer system resource 410 may have tags with multiple values as described herein above, with a value for a tag "TAG1" set to "1" and also a value for the tag "TAG1" set to "2." A computer system resource with multiple values for a tag such as "TAG1" may be used to select a computer system resource using multiple tags. For example, applying a filtering process 422 selecting resources where "TAG1=1" may select computer system resource 402, computer system resource 406 and computer system resource 410. Applying a filtering process 424 selecting resources where "TAG1=2" may select computer system resource 414 and computer system resource 418 and may also select computer system resource 410. The selection of computer system resource 410 under both filtering process 422 and filtering process 424 reflects the multiple values for tag "TAG1" in tags 412.

FIG. 5 illustrates an example environment 500 where an example structured description is illustrated as described herein at least in connection with FIG. 1 and in accordance with at least one embodiment. The structured description 502 may specify a set of resources with a tag representing the identifier (the "ID" tag) for each. For example, the "Front-End Service" specified in the structured description has a value for the tag "ID" set to "0001." The structured description 502 may also specify relationships between resources. For example, the "Front-End Service" connects to a "Load Balancer" ("ID: 0002") which balances "Scaling Group 0008" and "Scaling Group 0012" which are specified later in the structured description 502. The structured description 502 may also specify one or more additional tags. In the example illustrated in FIG. 5, an additional tag for "ENV" is specified for each resource. As may be contemplated, the scope of information contained in the structured description, the format of the structured description, the contents of the structured description, the type of resources shown in the structured description, the resource groupings in the structured description and the tags shown in the structured description that are described and/or illustrated herein in connection with the structured description 502 are merely illustrative examples and other such scopes of information, formats, contents, types of resources, resource groupings and tags associated with structured descriptions may be considered as within the scope of the present disclosure.

Figure 6:
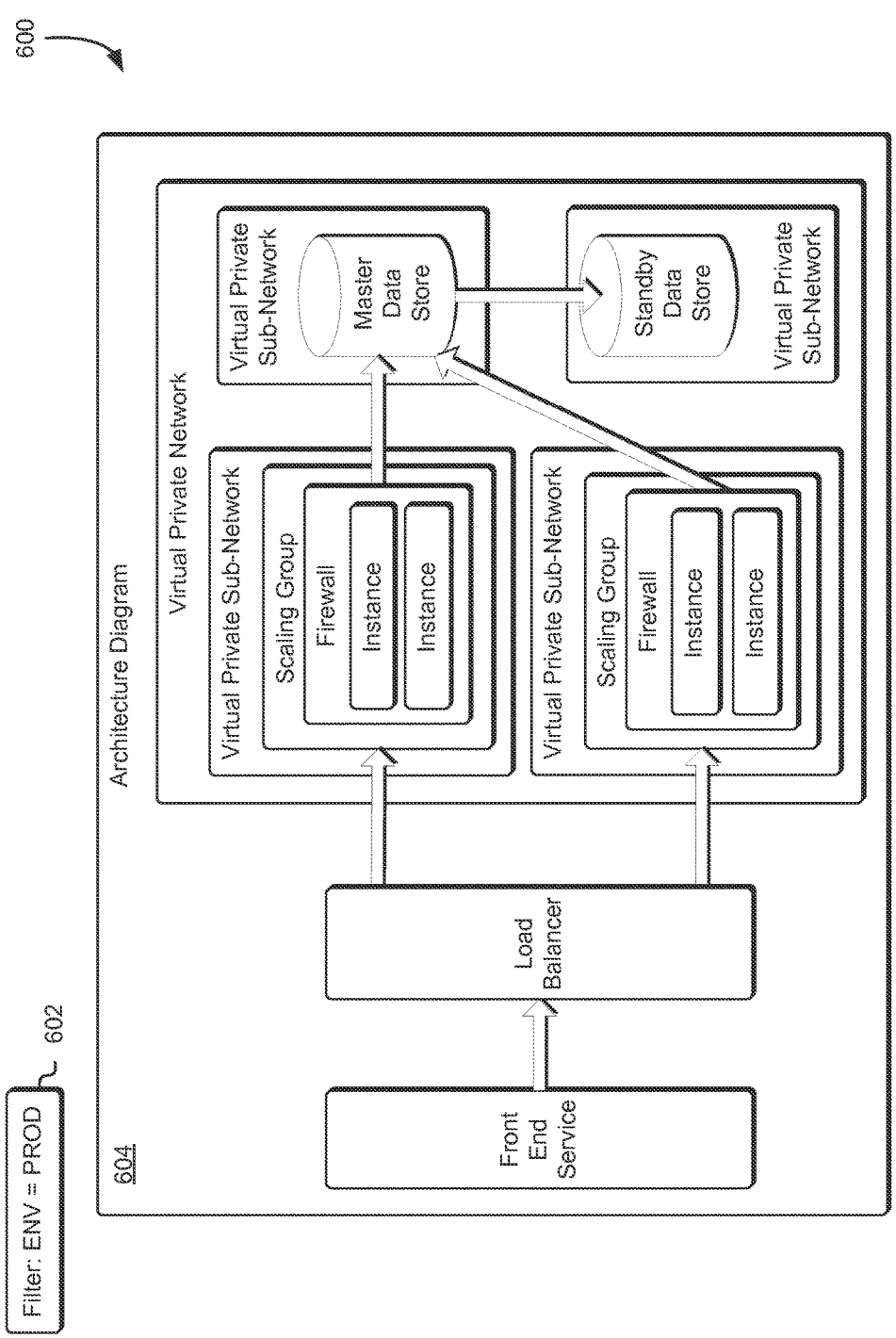
FIG. 6 illustrates an example environment where a filtered structured description is used to produce an architecture diagram in accordance with at least one embodiment.

FIG. 6 illustrates an example environment 600 where a filtering process is applied to a structured description to produce a filtered structured description which may then be used to produce an architecture diagram as described herein at least in connection with FIG. 1 and in accordance with at least one embodiment. The filtering process "ENV=PROD" 602 may be applied to the structured description 502 as described herein in connection with FIG. 5 to produce the architecture diagram 604 illustrated in FIG. 6. As each of the resources specified by structured description 502 include the tag "ENV: PROD" (indicating, for example, that all of the resources are part of the production environment) all of the resources may be included in the architecture diagram 604. The architecture diagram 604 illustrated in FIG. 6 includes the front-end service ("ID: 0001"), the load balancer ("ID: 0002"), the virtual private network ("ID: 0003"), all four virtual private sub-networks ("ID: 0004", "ID: 0005", "ID: 0006" and "ID: 0007"), both scaling groups ("ID: 0008" and "ID: 0012"), both firewalls ("ID: 0009" and "ID: 0013"), the four computer instances ("ID: 0010", "ID: 0011", "ID: 0014" and "ID: 0015") and both data stores ("ID: 0016" and "ID: 0017") as each of these resources include the tag that satisfies the filtering process "ENV=PROD" 602.

Figure 7:
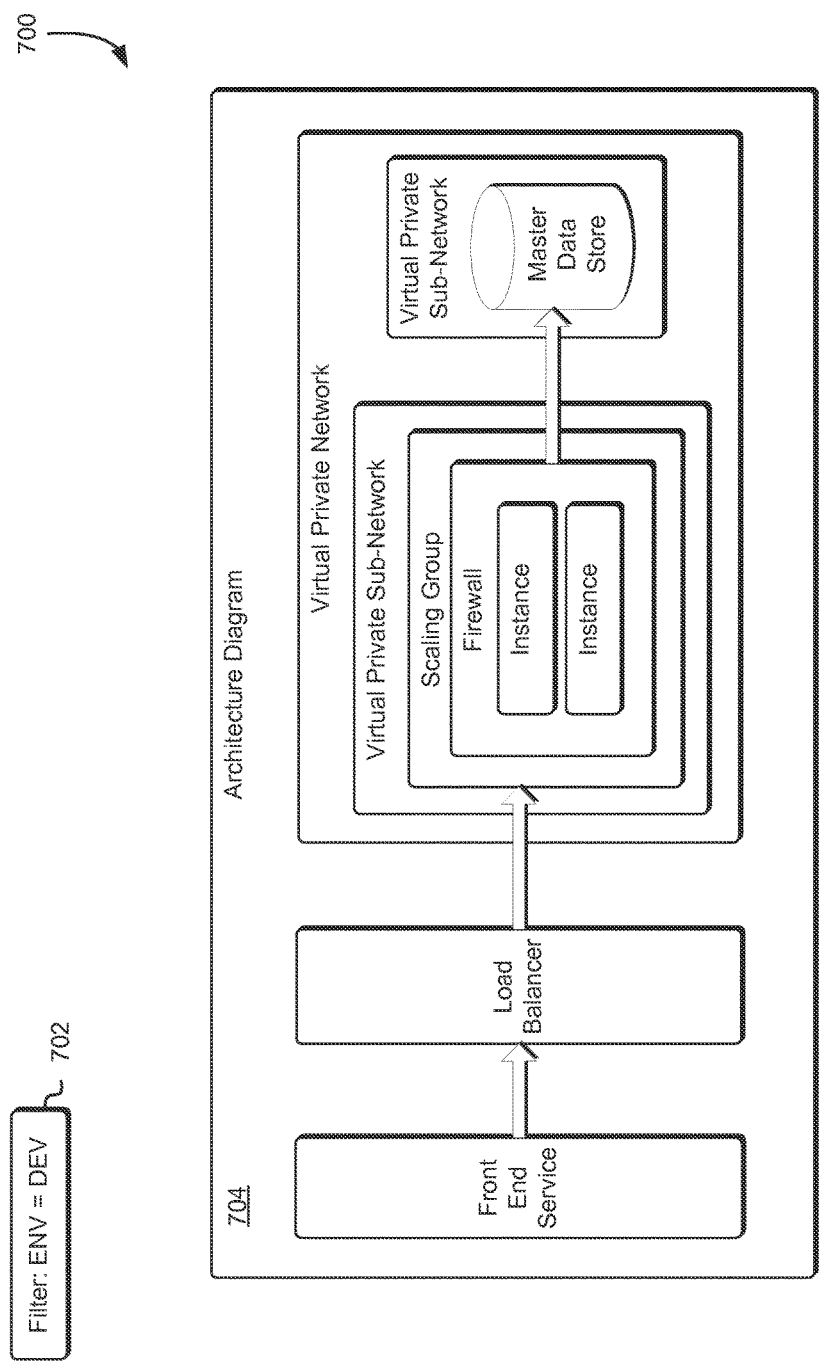
FIG. 7 illustrates an example environment where a filtered structured description is used to produce an architecture diagram in accordance with at least one embodiment.

FIG. 7 illustrates an example environment 700 where a filtering process is applied to a structured description to produce a filtered structured description which may then be used to produce an architecture diagram as described herein at least in connection with FIG. 1 and in accordance with at least one embodiment. The filtering process "ENV=DEV" 702 may be applied to the structured description 502 as described herein in connection with FIG. 5 to produce the architecture diagram 704 illustrated in FIG. 7. Only a subset of the resources specified by structured description 502 include the tag "ENV: DEV" (indicating, for example, that only some of the resources are part of the development environment) and thus only that subset of the resources may be included in the architecture diagram 704. The architecture diagram 704 illustrated in FIG. 7 includes the front-end service ("ID: 0001"), the load balancer ("ID: 0002"), the virtual private network ("ID: 0003"), two virtual private sub-networks ("ID: 0004 and "ID: 0006"), one scaling group ("ID: 0008"), one firewall ("ID: 0009"), two computer instances ("ID: 0010" and "ID: 0011") and one data store ("ID: 0016") as these are the resources that include the tag that satisfies the filtering process "ENV=DEV" 702.

Figure 8:
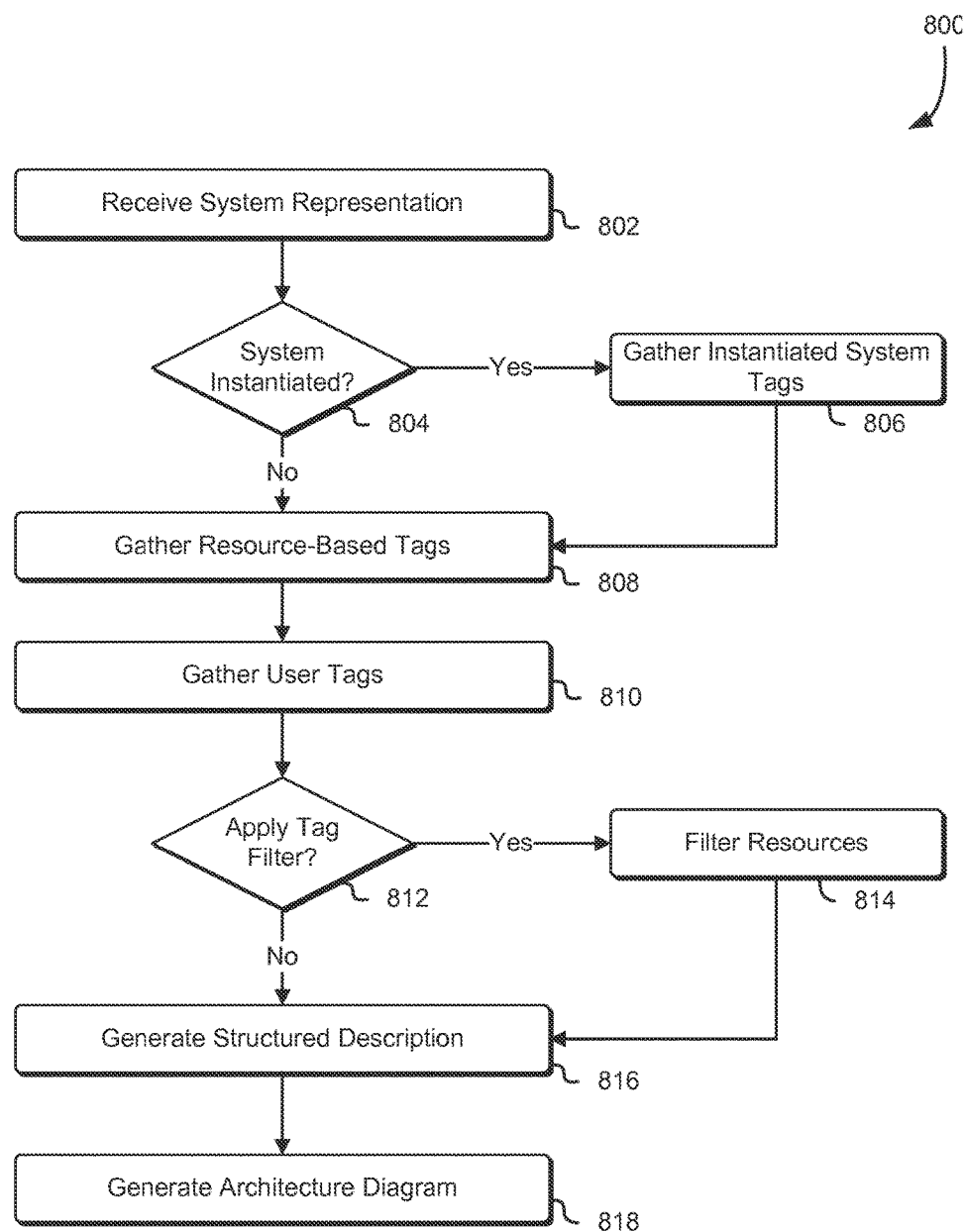
FIG. 8 illustrates an example process for automatically generating an architecture diagram in accordance with at least one embodiment.

FIG. 8 illustrates an example process 800 for automatically generating an architecture diagram as described herein at least in connection with FIG. 1 and in accordance with at least one embodiment. An architecture service such as the architecture service 118 described herein in connection with FIG. 1 may perform at least a portion of the process illustrated in FIG. 8. Other entities operating with a computer system environment may also perform at least a portion of the process illustrated in FIG. 8 including, but not limited to, services, applications, modules, processes, operating system elements, virtual machine elements, network hardware, controlling domain elements (e.g., a hypervisor) or combinations of these and/or other such entities operating within the computer system environment.

An architecture service may receive a system representation 802 as described herein above. The system representation may be based on a system specification and/or may be based on an instantiated system as described herein at least in connection with FIG. 2. If a computer system has been instantiated 804 based at least in part on the system specification, the architecture service may determine any resource-specific tags from the instantiated system 806. The architecture service may then gather any other resource-based tags 808 from the system representation, gather any user tags 810 and, if a tag filtering process should be applied 812, may use a filter process to filter the resources 814 in the system specification before. A structured description of the computer system may be generated 816 and an architecture diagram based at least in part on the structured description may also be generated 818.

Figure 9:
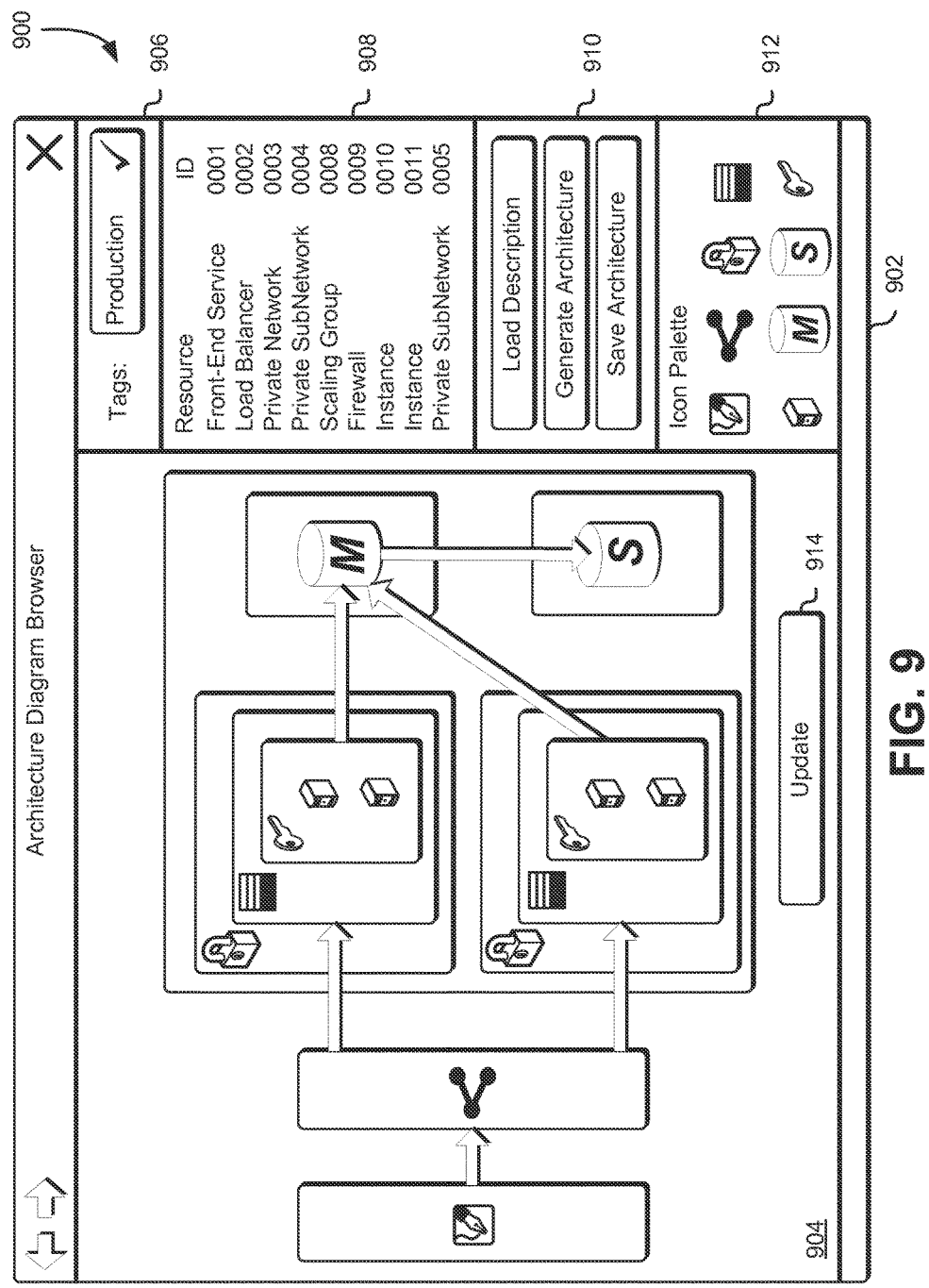
FIG. 9 illustrates an example environment where an architecture diagram browser may be used to display architecture diagrams in accordance with at least one embodiment.

FIG. 9 illustrates an example environment 900 where an architecture diagram browser may be used to display architecture diagrams as described herein at least in connection with FIG. 1 and in accordance with at least one embodiment. An architecture diagram browser 902 may be configured to produce architecture diagrams using structured descriptions as described herein above, save architecture diagrams, load architecture diagrams, apply filtering processes to architecture diagrams and/or perform other such processes associated with architecture diagrams. The architecture diagram browser 902 may be configured as a computer service such as a web service and may be provided as a service by the computing resource service provider 110 as described herein at least in connection with FIG. 1.

An architecture diagram browser 902 may include functionality 910 to perform operations such as loading structured descriptions, generating architecture diagrams, saving architecture diagrams and/or other such functionality. Loaded structured descriptions may be saved in a structured description repository, a data store or some other such location. Architecture diagrams may also be saved in a repository, data store or some other such location. An architecture diagram browser 902 may include functionality 908 to display at least a subset of a structured description and may also include functionality to display the filtered results of that structured description as a result of applying one or more filtering processes 906. The filtering processes 906 may be based at least in part on one or more tags as described herein above.

An architecture diagram browser 902 may include functionality to produce a displayed architecture diagram 904 based at least in part on the structured description and/or based at least in part on the filtered structured description. A displayed architecture diagram 904 may be displayed using block diagrams and may, in some embodiments, include one or more icons from an icon palette 912. The icons in the icon palette may represent a key or legend of the icons used to in displaying the displayed architecture diagram 904. The blocks and/or the icons may be arranged in the displayed architecture diagram 904 based at least in part on the topology of the computer system architecture and may include relationships (such as arrows) indicating connections and/or dependencies between the resources, resource groups and networks represented by the blocks and/or icons. The displayed architecture diagram 904 may additionally include text elements displaying, for example, tags associated with resource types, tags associated with resource instances, tags associated with resource groups, tags associated with networks or combinations of these and/or other such tags. The displayed architecture diagram 904 may additionally include text elements displaying other data and/or metadata associated with the resources, the resource groups, the networks, the structured description and/or the computer system. In some embodiments, the architecture diagram browser 902 may include functionality to update 914 (or refresh) the displayed architecture diagram 904 and may, in some embodiments, include functionality to provide settings relating to that update 914.

As may be contemplated, the contents of the architecture diagram browser 902 illustrated herein relating to browser functionality, display modalities, the presence and type of text elements, the presence and type of icon elements and/or other such user interface elements described herein in connection with the architecture diagram browser 902 are merely illustrative examples indicating an embodiment of the architecture diagram browser 902. As such, other types of browser functionality, display modalities, presence and type of text elements, presence and type of icon elements and/or other such user interface elements may be considered as within the scope of the present disclosure.

Figure 10:
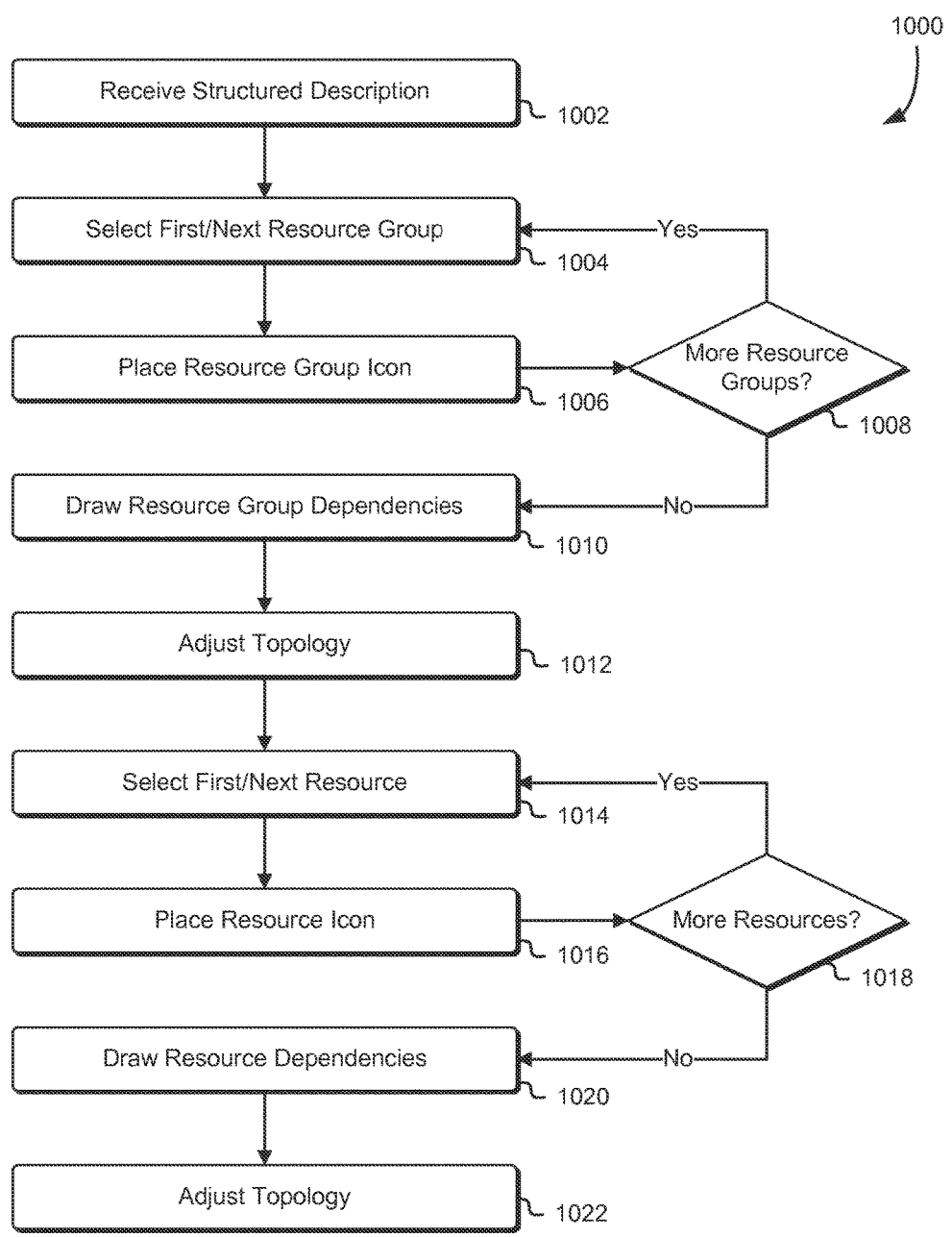
FIG. 10 illustrates an example process for automatically drawing an architecture diagram in accordance with at least one embodiment.

FIG. 10 illustrates an example process 1000 for automatically drawing an architecture diagram as described herein at least in connection with FIG. 1 and in accordance with at least one embodiment. An architecture service such as the architecture service 118 described herein in connection with FIG. 1 may perform at least a portion of the process illustrated in FIG. 10. An architecture diagram browser such as the architecture diagram browser 902 described herein in connection with FIG. 9 may perform at least a portion of the process illustrated in FIG. 10. Other entities operating with a computer system environment may also perform at least a portion of the process illustrated in FIG. 10 including, but not limited to, services, applications, modules, processes, operating system elements, virtual machine elements, network hardware, controlling domain elements (e.g., a hypervisor) or combinations of these and/or other such entities operating within the computer system environment.

A structured description of a computer system may be received 1002. The structured description may be filtered by a filtering process as described herein at least in connection with FIG. 1 and in accordance with at least one embodiment. A first resource group may be selected 1004 and placed within the architecture diagram 1006. Resource groups may continue to be selected and placed until there are no more resource groups 1008. In some embodiments, the placement of resource groups may include the placement of network and/or sub-network groups. In some embodiments, the placement of network and/or sub-network groups may be performed as a separate step. Resource groups which are contained within other resource groups may be placed within their parent resource groups. Sub-networks which are contained within other networks and/or sub-networks maybe placed within their parent networks and/or sub-networks. Any derived and/or inferred dependencies and/or connections between resource groups may next be drawn 1010 and, prior to adding resources to resource groups, one or more adjustments to the topology 1012 of the placements may be made to the architecture diagram (such as, for example, to eliminate crossing lines).

The process illustrated in FIG. 10 may then continue by placing resources which may be contained in one or more of the resource groups, one or more of the networks and/or sub-networks or in stand-alone locations on the diagram. A first resource may be selected 1014 and placed within the architecture diagram 1016. Resources may continue to be selected and placed until there are no more resources 1018. Just as with resource groups, any derived and/or inferred dependencies and/or connections between resources, between resources and resource groups, between resources and networks and/or sub-networks and/or other such dependencies and/or connections may next be drawn 1020 and one or more final adjustments to the topology 1022 of the placements may be made to the architecture diagram (such as, for example, to eliminate crossing lines and any other such confusing graphical elements).

Figure 11:
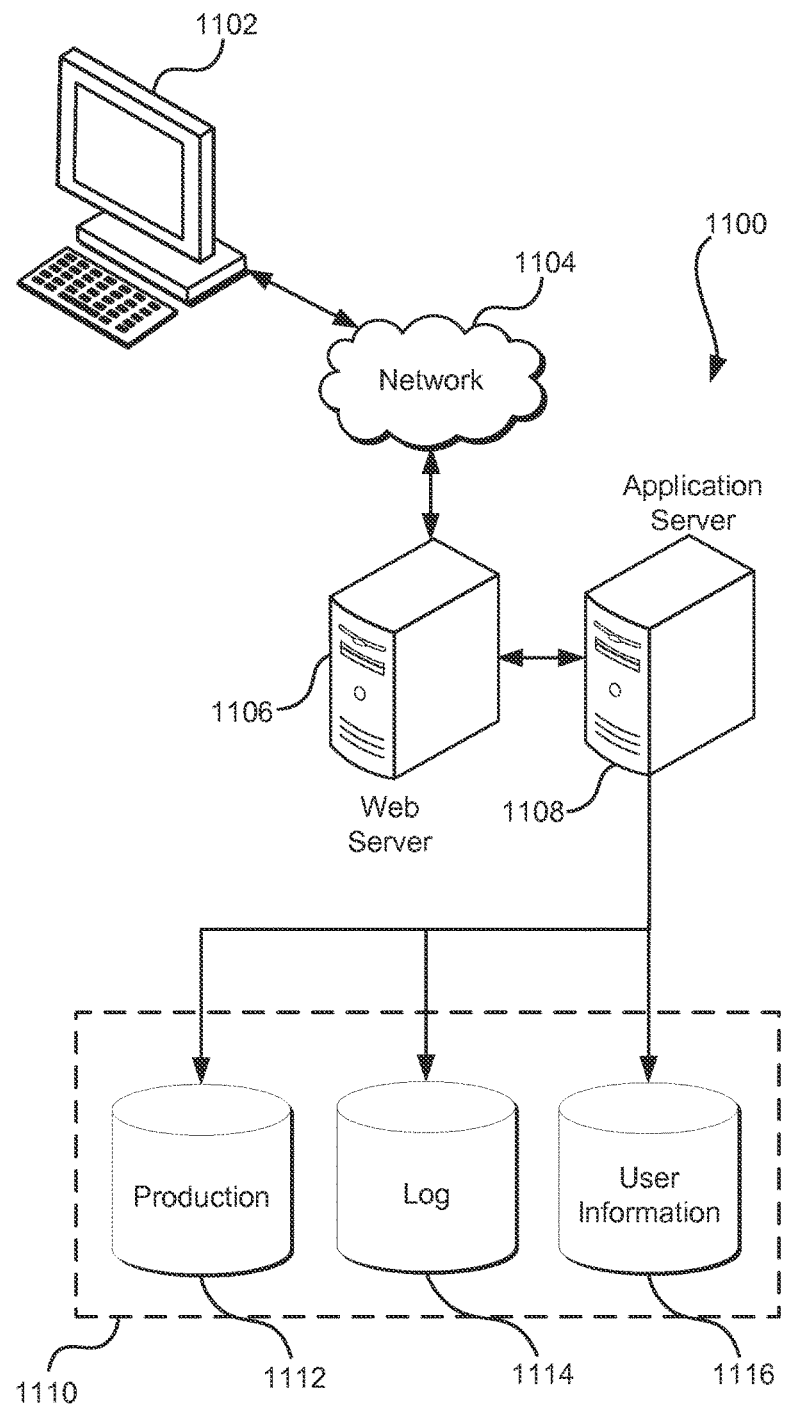
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   determining a system specification, the system specification indicating a set of resources associated with a distributed computer system, the set of resources comprising individual computer systems in the distributed computer systems, the system specification further indicating a set of dependencies between one or more pairs of resources in the set of resources associated with the distributed computer system;
   determining a first tag associated with a first subset of the set of resources and a second tag associated with a second subset of the set of resources, the first tag specifying a first tag name and a first tag value and the second tag specifying a second tag name and a second tag value, wherein the first subset and the second subset intersect;
   performing one or more filtering processes on the set of resources to produce a filtered subset of the set of resources, the one or more filtering processes based at least in part on the first tag and the second tag;
   generating an architecture diagram of the distributed computer system, the architecture diagram specifying one or more of the set of resources in the filtered subset of the set of resources, the architecture diagram further specifying one or more topological relationships between pairs of resources in the filtered subset of the set of resources, the one or more topological relationships being based at least in part on one or more of the set of dependencies; and as a result of receiving one or more computer system events, updating the architecture diagram of the distributed computer system to reflect changes in the distributed computer system, the one or more computer system events including at least one of:
  a first event specifying one or more alterations to the set of resources,
  a second event specifying one or more alterations to the first tag and the second tag,
  a third event specifying one or more alterations to the filtered subset of the set of resources, or
  a fourth event specifying one or more alterations to the set of dependencies.

2. The computer-implemented method of claim 1, further comprising displaying the architecture diagram using an architecture diagram browser, the architecture diagram browser configured to at least display the architecture diagram using a palette of computer system resource icons.

3. A system, comprising:
  one or more processors; and
  a memory storing executable instructions that, as a result of being executed on the one or more processors, cause the system to:
    obtain a system specification of a computer system, the system specification comprising:
      a first set of resources associated with the computer system, the first set of resources comprising individual computer systems in the computer system;
      a second set of dependencies between one or more pairs of resources in the first set of resources;
      a third set of metadata items specifying a first property associated with a first subset of the first set of resources, the first property specifying a first property name and a first property value;
      a fourth set of metadata items specifying a second property associated with a second subset of the first set of resources, the second property specifying a second property name and a second property value, wherein the first subset and the second subset intersect;
    perform one or more filtering processes on the first set of resources to produce a filtered subset of the first set of resources, the one or more filtering processes based at least in part on the one or more metadata items of the third set of metadata items; and
    create a graphical representation of the computer system, the graphical representation:
      specifying one or more of the first set of resources in the filtered subset of the first set of resources and one or more relationships between one or more pairs of the one or more resources of the filtered subset of the first set of resources; and
      is based at least in part on a structured description, the structured description specifying one or more topological relationships between pairs of resources in the filtered subset of the first set of resources, the one or more topological relationships being based at least in part on one or more of the second set of dependencies.

4. The system of claim 3, wherein the graphical representation is an architecture diagram.

5. The system of claim 3, wherein, as a result of receiving one or more computer system events, the graphical representation of the computer system is updated to reflect changes in the computer system.

6. The system of claim 5, wherein the one or more computer system events include one or more events specifying one or more alterations to one or more of the one or more filtering processes.

7. The system of claim 5, wherein the one or more computer system events include one or more events specifying one or more alterations to the first set of resources, the one or more alterations based at least in part on one or more resource requirements associated with one or more resources of the first set of resources.

8. The system of claim 3, wherein the executable instructions that cause the system to obtain the system specification comprising the second set of dependencies include instructions that cause the system to infer at least a subset of the second set of dependencies from information associated with one or more of the resources in the first set of resources.

9. A non-transitory computer-readable storage medium having stored thereon executable instructions that, as a result of being executed by one or more processors of a computer system, cause the computer system to:
  receive information specifying a first set of resources associated with the computer system, wherein the first set of resources comprises individual computer systems in the computer system;
  receive a second set of dependencies between one or more pairs of resources in the first set of resources;
  receive a first tag associated with a first subset of resources in the first set of resources and a second tag associated with a second subset of resources in the first set of resources, the first tag specifying a first tag name and a first tag value and the second tag specifying a second tag name and a second tag value, wherein the first subset and the second subset intersect; and
  create a graphical representation of the computer system, the graphical representation:
    specifying a first subset of the first set of resources and one or more relationships between one or more pairs of one or more resources of the first subset of the first set of resources, the first subset of the first set of resources selected from the first set of resources based at least in part on performing one or more filtering processes on the first set of resources, the one or more filtering processes based at least in part on one or more tags in the first tag and the second tag; and
    is based at least in part on information specifying one or more topological relationships between pairs of resources in the first subset of the first set of resources, the topological relationships being based at least in part on one or more dependencies in the second set of dependencies.

10. The non-transitory computer-readable storage medium of claim 9, wherein the graphical representation is an architecture diagram.

11. The non-transitory computer-readable storage medium of claim 9, wherein the graphical representation is displayed via a graphical representation browser, the graphical representation browser configured to at least display the graphical representation using a palette of computer system resource icons.

12. The non-transitory computer-readable storage medium of claim 11, wherein the computer system resource icons from the palette of computer system resource icons are configured to provide metadata associated with one or more resources in the first set of resources.

13. The non-transitory computer-readable storage medium of claim 9, wherein the executable instructions further include instructions that cause the computer system to update, based on one or more computer system events, the graphical representation of the computer system to reflect changes in the computer system.

14. The non-transitory computer-readable storage medium of claim 13, wherein the executable instructions that cause the computer system to update the graphical representation include instructions that cause the computer system to execute one or more application programming interface calls to one or more of the one or more resources.

15. The system of claim 4, wherein the architecture diagram is displayed via an architecture diagram browser, the architecture diagram browser at least displaying the architecture diagram using a palette of computer system resource icons.

16. The non-transitory computer-readable storage medium of claim 10, wherein the architecture diagram is displayed via an architecture diagram browser, the architecture diagram browser at least displaying the architecture diagram using a palette of computer system resource icons.

17. The computer-implemented method of claim 1, wherein determining the system specification includes inferring, based at least in part on a resource type of a first resource in the set of resource, a dependency between the first resource and a second resource, the first resource and the second resource comprising one of the pair of resources.

18. The computer-implemented method of claim 1, wherein determining the system specification includes inferring, based at least in part on security data about the distributed computer system, a dependency between a pair of resources in the set of resources.

19. The system of claim 3, wherein the executable instructions further cause the system to display the graphical representation using a palette of computer system resource icons.

20. The non-transitory computer-readable storage medium of claim 9, wherein the executable instructions further cause the computer system to display the graphical representation using a palette of computer system resource icons.

* * * * *